United States Patent
Wong et al.

(10) Patent No.: US 11,455,415 B2
(45) Date of Patent: Sep. 27, 2022

(54) METHOD, SYSTEM, AND DEVICE FOR MANAGING DATABASE PERMISSIONS, AND COMPUTER-READABLE STORAGE MEDIUM

(71) Applicant: PING AN TECHNOLOGY (SHENZHEN) CO., LTD., Guangdong (CN)

(72) Inventors: Yeung Wong, Hong Kong (CN); Jinfang Gao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 924 days.

(21) Appl. No.: 16/318,931

(22) PCT Filed: Nov. 23, 2017

(86) PCT No.: PCT/CN2017/112653
§ 371 (c)(1),
(2) Date: Jan. 18, 2019

(87) PCT Pub. No.: WO2018/176864
PCT Pub. Date: Oct. 4, 2018

(65) Prior Publication Data
US 2019/0236304 A1    Aug. 1, 2019

(30) Foreign Application Priority Data
Mar. 31, 2017   (CN) .......................... 201710211546.5

(51) Int. Cl.
*G06F 21/62*   (2013.01)
*H04L 9/40*   (2022.01)
(Continued)

(52) U.S. Cl.
CPC ...... *G06F 21/6227* (2013.01); *G06F 16/2282* (2019.01); *G06F 16/27* (2019.01);
(Continued)

(58) Field of Classification Search
CPC .. G06F 21/6227; G06F 16/2282; G06F 16/27; G06F 16/284; H04L 63/0815; H04L 63/10
See application file for complete search history.

(56) References Cited

U.S. PATENT DOCUMENTS 6,999,956 B2   2/2006   Mullins
7,865,959 B1 *  1/2011   Lewis ................. G06F 21/6218
                                                                726/17
(Continued)

FOREIGN PATENT DOCUMENTS

CN    101147146 A    3/2008
CN    102034036      4/2011
(Continued)

OTHER PUBLICATIONS

Chinese Office Action issued in corresponding Chinese Application No. 201710211546.5, dated Aug. 5, 2019, pp. 1-7, The State Intellectual Property Office, Beijing, China.
(Continued)

*Primary Examiner* — Mohammed Waliullah
(74) *Attorney, Agent, or Firm* — Hauptman Ham, LLP (57) ABSTRACT

Disclosed is a method for managing database permissions, the method including: obtaining a login account that successfully logs in to a first database, where the first database is a relational database built in with permission management and is pre-configured with an external table that has a mapping relationship with a second database; ascertaining management permissions of the login account based on pre-configured management permission information; deter-
(Continued)

mining whether a management operation on the external table by the login account exceeds the management permissions of the login account; and if the management operation by the login account does not exceed its management permissions, permitting the management operation, and synchronizing the management operation to the second database based on the mapping relationship between the external table and the second database. Further disclosed are a system and a device for managing database permissions, as well as a computer-readable storage medium.

14 Claims, 6 Drawing Sheets

(51) Int. Cl.
*G06F 16/27* (2019.01)
*G06F 16/22* (2019.01)
*G06F 16/28* (2019.01)

(52) U.S. Cl.
CPC ........ *G06F 16/284* (2019.01); *H04L 63/0815* (2013.01); *H04L 63/10* (2013.01)

(56) References Cited

U.S. PATENT DOCUMENTS

| | | | |
|---|---|---|---|
| 9,172,678 | B2 | 10/2015 | Wang et al. |
| 9,537,829 | B2 | 1/2017 | Wang et al. |
| 2002/0091702 | A1 | 7/2002 | Mullins |
| 2013/0007232 | A1 | 1/2013 | Wang et al. |
| 2016/0043998 | A1 | 2/2016 | Wang et al. |
| 2018/0225352 | A1* | 8/2018 | Purushothaman .... G06F 16/278 |

FOREIGN PATENT DOCUMENTS

| | | | |
|---|---|---|---|
| CN | 102129539 | A | 7/2011 |
| CN | 102308297 | A | 1/2012 |
| CN | 102426611 | | 4/2012 |
| CN | 102708316 | | 10/2012 |
| CN | 102708316 | A * | 10/2012 |
| CN | 102982130 | A | 3/2013 |
| CN | 103530568 | A | 1/2014 |
| CN | 104219085 | | 5/2014 |
| CN | 104317921 | A | 1/2015 |

OTHER PUBLICATIONS

International search report dated Jan. 26, 2018 from corresponding application No. PCT/CN2017/112653.

* cited by examiner

METHOD, SYSTEM, AND DEVICE FOR MANAGING DATABASE PERMISSIONS, AND COMPUTER-READABLE STORAGE MEDIUM

CROSS-REFERENCE TO RELATED APPLICATIONS

The present application is the National Stage of International Application No. PCT/CN2017/112653, filed Nov. 23, 2017, which claims the benefit of China Patent Application No. 201710211546.5, filed Mar. 31, 2017 with the State Intellectual Property Office and entitled "Method and System for Managing Database Permissions".

TECHNICAL FIELD

The present application relates to the technical field of database security, and more particularly relates to a method, a system and a device for managing database permissions, as well as a computer-readable storage medium.

BACKGROUND

Non-relational databases such as Redis are open source, high-performance key-value databases, which pursue efficiency and conciseness.

However, there lacks role management functionality in the background management of the non-relational databases such as Redis. As a result, all users log in to the database through the same account name and password. That means, one can log in to the Redis database and perform operations such as data insertion, data deletion, and so on without restriction, as long as the account name and password of the Redis database are available. This brings great risk to the data security of the database.

SUMMARY

It is therefore a primary objective of the present application to provide a method, a system, and a device for managing database permissions, as well as a computer-readable storage medium, in order to solve the technical problem that the database cannot implement permission management which would lead to security risks.

To achieve the above objective, the present application provides a method for managing database permissions, the method including the following operations: obtaining a login account that successfully logs in to a first database, where the first database is a relational database built in with permission management and is pre-configured with an external table that has a mapping relationship with a second database; ascertaining management permissions of the login account based on pre-configured management permission information; determining whether a management operation on the external table by the login account exceeds the management permissions of the login account; and if the management operation by the login account does not exceed its management permissions, permitting the management operation, and synchronizing the management operation to the second database based on the mapping relationship between the external table and the second database.

In addition, to achieve the above objective, the present application further provides a system for managing database permission, the system including: an acquisition module, configured to obtain a login account that successfully logs in to a first database, where the first database is a relational database built in with permission management and is pre-configured with an external table that has a mapping relationship with a second database; a permission module, configured to ascertain management permissions of the login account based on pre-configured management permission information; a determination module, configured to determine whether a management operation on the external table by the login account exceeds the management permissions of the login account; and a synchronization module, configured to permit the management operation by the login account if the management operation does not exceed its management permissions, and synchronize the management operation to the second database based on the mapping relationship between the external table and the second database.

In addition, to achieve the above objective, the present application still further provides a device for managing database permissions, the device including a memory, a processor, and a database permission management program that is stored in the memory and operable on the processor, where the processor is configured to execute the database permission management program so perform the following operations: obtaining a login account that successfully logs in to a first database, where the first database is a relational database built in with permission management and is pre-configured with an external table that has a mapping relationship with a second database; ascertaining management permissions of the login account based on pre-configured management permission information; determining whether a management operation on the external table by the login account exceeds the management permissions of the login account; and if the management operation by the login account does not exceed its management permissions, permitting the management operation, and synchronizing the management operation to the second database based on the mapping relationship between the external table and the second database.

In addition, to achieve the above objective, the present application still further provides a computer-readable storage medium having stored therein a database permission management program, the database permission management program when executed by a processor performing the following operations: obtaining a login account that successfully logs in to a first database, where the first database is a relational database built in with permission management and is pre-configured with an external table that has a mapping relationship with a second database; ascertaining management permissions of the login account based on pre-configured management permission information; determining whether a management operation on the external table by the login account exceeds the management permissions of the login account; and if the management operation by the login account does not exceed its management permissions, permitting the management operation, and synchronizing the management operation to the second database based on the mapping relationship between the external table and the second database.

According to the method, system, and device for managing database permissions, as well as a computer-readable storage medium that are provided by embodiments of the present application, a login account that successfully logs in to a first database is first obtained, where the first database is a relational database built in with permission management and is pre-configured with an external table that has a mapping relationship with a second database. Then based on pre-configured management permission information, management permissions of the current login account are ascertained for purposes of permission management and control of the current login account. Then based on the management permissions of the current login account, a management operation performed by the current login account on the external table is determined as to whether it exceeds the management permissions of the current login account. If the management permission by the current login account does not exceed its management permissions, then the management operation is permitted, and this management operation is further synchronized to the second database based on the mapping relationship between the external table and the second database. Because the management operation on the second database is performed with permission management and control, this realizes the background permission management of the second database. By connecting the first database and the second database through the external table that is previously created in the first database and that has a mapping relationship with the second database, the present application enables accessing the second database via the first database. When the login account performs a management operation on the external table in the first database, it is actually performing a management operation on the second database thanks to the mapping relationship between the external table and the second database. Therefore, the permission management function of the first database can be taken advantage of to restrict the management operations performed by the login account on the external table based on the login account's management permissions in the first database, thereby correspondingly restricting the management operations on the second database and so realizing the permission management of the second database. As such, a non-relational database such as Redis can be managed and controlled by the data operation permissions as the second database, which avoids the security risks posed by the fact that the database cannot implement permission management and control, and further improves the background management security of non-relational databases such as Redis.

Various implementations, functional features, and advantages of this application will now be described in further detail in connection with embodiments and the accompanying drawings.

DETAILED DESCRIPTION OF ILLUSTRATIVE EMBODIMENTS

It will be appreciated that the specific embodiments described herein are merely illustrative of the application and are not intended to limit the application.

Figure 1:
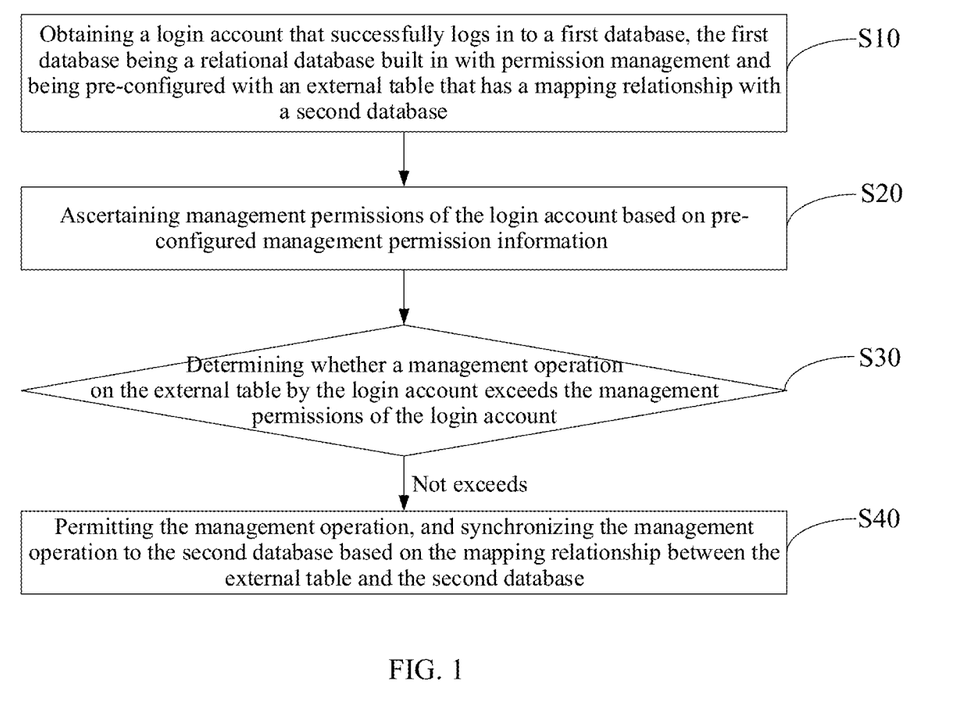
FIG. 1 is a flowchart illustrating a first embodiment of a method for managing database permissions according to the present application.

As illustrated in FIG. 1, a first embodiment of a method for managing database permissions (hereinafter also interchangeably referred to as a database permission management method) according to the present application provides a database permission management method. The database permission management method includes the following blocks S10 to S40.

In block S10, the method includes: obtaining a login account that successfully logs in to a first database, where the first database is a relational database built in with permission management and is pre-configured with an external table that has a mapping relationship with a second database.

This application utilizes the permission management function of the first database to determine the management permissions of the login account, thereby monitoring the management operations on the second database that are performed by this login account based on the external table in the first database, which thus realizes the background permission management of non-relational databases such as Redis.

Specifically, as one implementation, the user may use a pre-configured account to log in to the first database, by entering a login credential such as an account name and a password thus issuing a login request.

The first database is a relational database built in with permission management functionality, such as a PostgreSQL database.

The first database is pre-configured with an external table that has a mapping relationship with the second database. That is, the data stored in the second database would be synchronized to the external table, and an operation on the external table or on the data in the external table would also be synchronized to the second database, so that the second database is inserted into the first database in the form of an external table. It should be noted that the second database is a non-relational database such as Redis, and does not have permission management functionality.

When it receives the login request, the permission management system obtains the login credential such as the account name and password carried by the login request for verification.

If the login request passes the verification, then the permission management system would obtain the account that is currently successfully logged into the first database. The method then proceeds to block S20.

In S20, the method includes: ascertaining management permissions of the login account based on pre-configured management permission information.

After the login account that successfully logs in to the first database is obtained, the management permissions of the current login account are ascertained based on the pre-configured management permission information.

It should be noted that the first database manages the database access permissions through roles, where each role may be a database user or a group of database users, and each role corresponds to an account. The management permissions of each role can be flexibly configured according to actual needs, including read, write, delete, search, and other permissions.

For example, assume there is a login account named dbatest. After detecting the login of the account, the pre-configured management permission information is searched for the corresponding management permissions of dbatest. Thus, the management permissions of dbatest can be ascertained. The method then continues to block S30.

In S30, the method includes: determining whether a management operation on the external table by the login account exceeds the management permissions of the login account.

After ascertaining the management permissions of the login account, the permission management system would supervise this login account to make sure that the login account performs management operations on the second database via the external table in the first database only within its scope of management permissions.

Therefore, after the account is logged into the first database, the external table can be utilized to implement access to the data in the second database, and to further perform management operations on the second database within the scope of management permissions of this account.

Specifically, the login account can access the external table by using the SQL syntax. Thanks to the mapping relationship between the external table and the second database, the login account is actually accessing the second database via the external table.

Because the data the user sees is mapped to the external table from the second database, the user is actually currently accessing the second database.

When the user enters a management operation request, the permission management system would ascertain whether this management operation exceeds the scope of management permissions of this login account. The method then proceeds to block S40.

In S40, the method includes: if the management operation by the login account does not exceed its management permissions, permitting the management operation, and synchronizing the management operation to the second database based on the mapping relationship between the external table and the second database.

If it is found that this management operation falls within the scope of management permissions of the current login account, then this management operation would be permitted.

Specifically, data processing can be performed on the external table according to the management operation, such as inserting data, deleting data, deleting a table, and the like.

Meanwhile, the changes of the external table need to be updated synchronously to the second database based on the mapping relationship between the external table and the second database, in order to perform an identical management operation on the second database.

For example, there is now an account dbatest that has successfully logged into the first database, and the permission management system searches in pre-configured management permission information and finds that the dbatest has only the management permission of "select", then the dbatest would only be allowed to perform "select" operations when accessing the data of the second database via the external table.

According to this embodiment, a login account that successfully logs in to a first database is first obtained, where the first database is a relational database built in with permission management and is pre-configured with an external table that has a mapping relationship with a second database. Then based on pre-configured management permission information, management permissions of the current login account are ascertained for purposes of permission management and control of the current login account. Then based on the management permissions of the current login account, a management operation performed by the current login account on the external table is determined as to whether it exceeds the management permissions of the current login account. If the management permission by the current login account does not exceed its management permissions, then the management operation is permitted, and this management operation is further synchronized to the second database based on the mapping relationship between the external table and the second database. Because the management operation on the second database is performed with permission management and control, this realizes the background permission management of the second database. By connecting the first database and the second database through the external table that is previously created in the first database and that has a mapping relationship with the second database, this embodiment enables accessing the second database via the first database. When the login account performs a management operation on the external table in the first database, it is actually performing a management operation on the second database thanks to the mapping relationship between the external table and the second database. Therefore, the permission management function of the first database can be taken advantage of to restrict the management operations performed by the login account on the external table based on the login account's management permissions in the first database, thereby correspondingly restricting the management operations on the second database and so realizing the permission management of the second database. As such, a non-relational database such as Redis can be managed and controlled by the data operation permissions as the second database, which avoids the security risks posed by the fact that the database cannot implement permission management and control, and further improves the background management security of non-relational databases such as Redis.

Figure 2:
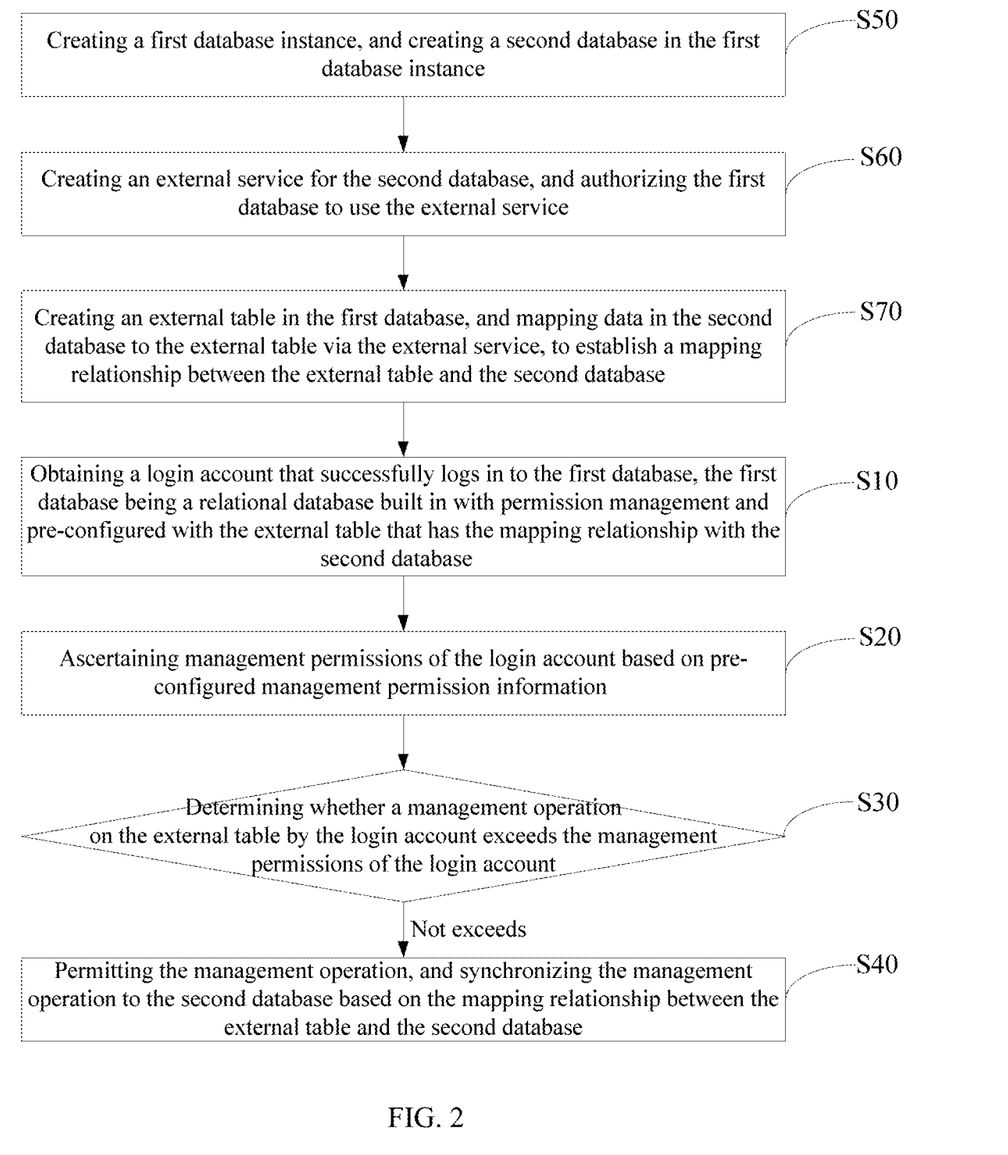
FIG. 2 is a flowchart illustrating a second embodiment of a method for managing database permissions according to the present application.

As illustrated in FIG. 2, a second embodiment of the database permission management method according to the present application further provides a database permission management method, which further includes the following blocks S50 to S70 on the basis of the above-described first embodiment of the database permission management method according to this application.

In S50, a first database instance is created, and a second database is further created in the first database instance.

In order to achieve the purpose of remotely accessing the second database based on the first database, the permission management system first needs to build up a first database instance. For example, to create a PostgreSQL instance.

In this embodiment, the PostgreSQL database instance is taken as an example of the first database instance for illustration purposes.

Then, the second database is created in the PostgreSQL database instance. This embodiment uses a Redis database as an example of the second database for illustration purposes.

In S60, an external service is created for the second database, and the first database is authorized to use the external service.

After the second database is created, the permission management system needs to establish a link between the first database and the second database.

First, the permission management system creates an extension by using the "create extension" statement of the SQL syntax, and then installs a Redis_fdw (foreign-data wrapper) module.

Then, the permission management system uses the "create server" statement of the SQL syntax to create an external service of Redis, and further sets the Address and Port of the external service. It should be noted that the Address and the Port of the external service should be set the same as the Address and the Port of the Redis database, so that a link can be established with the Redis database.

After the creation of the external service is completed, the permission management system authorizes the external service to be used by the PostgreSQL database, so that the PostgreSQL database can establish a link with the Redis database.

In S70, an external table is created in the first database, and data in the second database is mapped to the external table via the external service, to establish a mapping relationship between the external table and the second database.

After establishing the link with the Redis database, the permission management system creates an external table in the PostgreSQL database, and maps the data of the Redis database to the external table, to establish a mapping relationship between the external table and the Redis database. As such, the Redis database is inserted into the PostgreSQL database in the form of an external table.

Thereafter, the user can perform management operations such as query, add, delete and the like synchronously on the data in the Redis database by performing management operations such as query, add, delete and the like on the external table.

Figure 3:
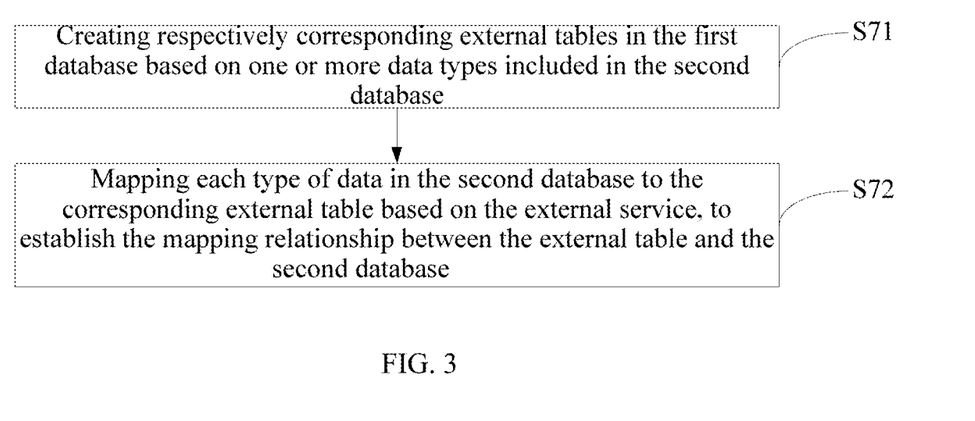
FIG. 3 is a detailed flowchart illustrating the process of "creating an external table in the first database, and mapping the data in the second database to the external table based on an external service so as to establish a mapping relationship between the external table and the second database" as shown in FIG. 2.

Further, referring now to FIG. 3, as one implementation, block S70 includes the following S71 and S72.

In S71, the block includes: creating respectively corresponding external tables in the first database based on one or more data types included in the second database.

In S72, the block includes: mapping each type of data in the second database to the corresponding external table based on the external service, so as to establish the mapping relationship between the external table and the second database.

When creating the external table, the permission management system may create corresponding external tables based on the data types such as characters, a set, a list, etc. contained in the Redis database.

Then, based on the external service of the Redis database, the permission management system maps the data in the Redis database to the corresponding external tables respectively according to the data types, to establish the mapping relationship between the external table and the Redis database. Therefore, the various types of data in the Redis database can be accessed via the external table for management operations.

This realizes cross-database operations on the data.

Further, a plurality of first databases may be created in a first database instance, and each first database corresponds to a different second database, thereby realizing permission management of a plurality of second databases.

In this embodiment, a first database instance is created and a second database is further created in the first database instance. Then an external service is created for the second database, and the first database is authorized to use the external service, thereby establishing a link between the first database and the second database. Then an external table is created in the first database, and the data of the second database is mapped to the external table based on the external service of the second database to establish a mapping relationship between the external table and the second database. As such, the second database is inserted into the first database in the form of an external table, so that the second database can be accessed via the external table in the first database. In this embodiment, by creating an external table in the first database, cross-database operations between the first database and the second database are realized. Thus, permission management and control of the second database can be achieved based on the permission management of the first database.

Figure 4:
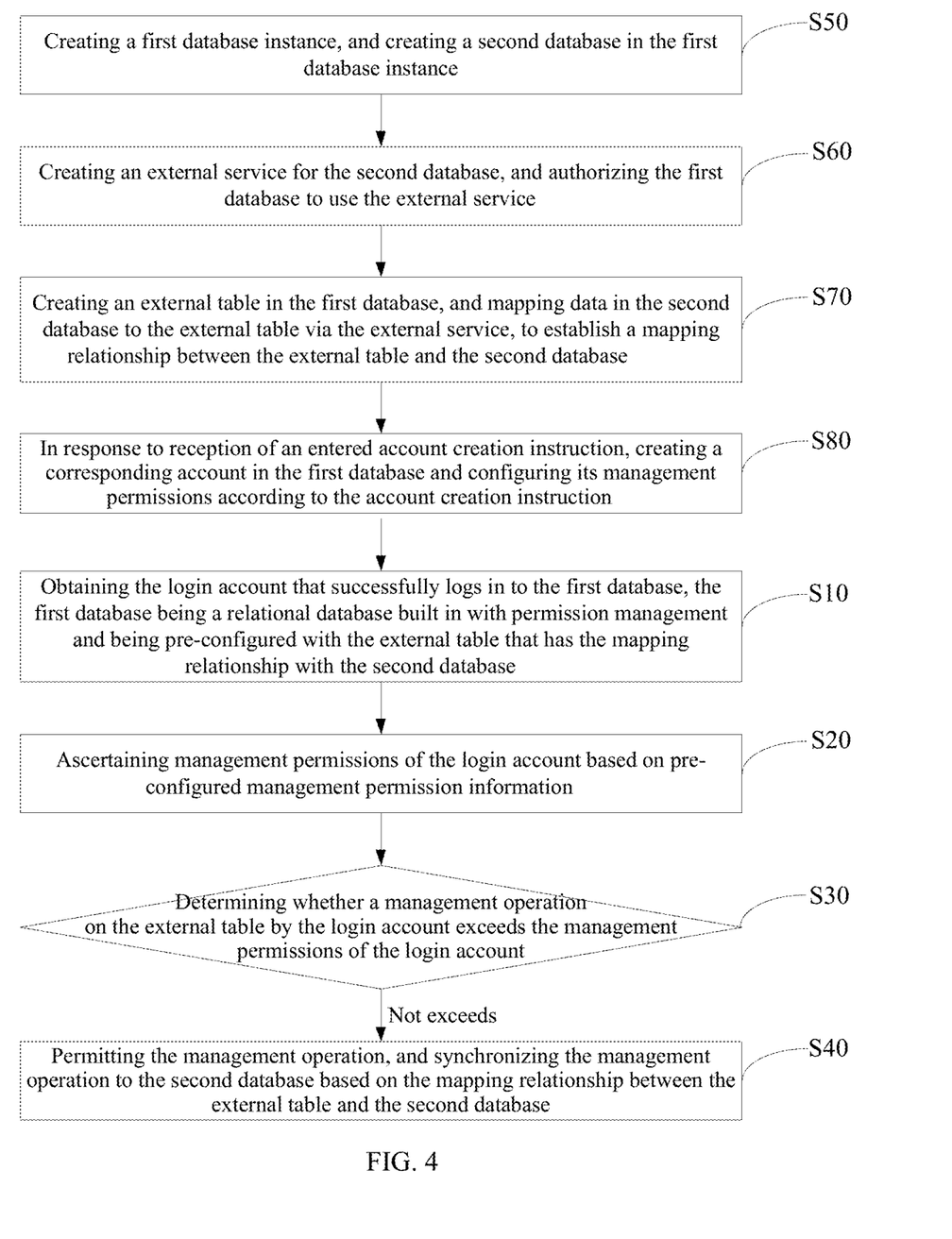
FIG. 4 is a flowchart illustrating a third embodiment of a method for managing database permissions according to the present application.

As illustrated in FIG. 4, a third embodiment of the database permission management method according to the present application further provides a database permission management method, which further includes the following block S80 on the basis of the above-described second embodiment of the database permission management method according to this application.

In S80, the method includes: in response to reception of an entered account creation instruction, creating a corresponding account in the first database and configuring its management permissions according to the account creation instruction.

After the permission management system creates the external table, the user can configure a user account as well as its corresponding management permissions according to needs.

After receiving the user-entered account creation instruction, the permission management system creates a corresponding account in the first database according to an account name carried by the account creation instruction. Further, based on the permission information carried by the account creation instruction, the permission management system correspondingly configures the management permissions of this account.

The management permissions of the account include search, insert, create, delete, modify, update, and so on.

Thereafter, the user can log in to the first database using the created account, and perform management operations on the data of the second database via the external table in the first database based on the management permissions of the account.

In this embodiment, if an entered account creation instruction is received, then a corresponding account is created in the first database and the management permissions of the account are further configured, according to the account creation instruction. As such, the user can create user accounts and management permissions of different roles according to needs, so that the roles having different needs can perform management operations on the data in the second database within their scopes of management permissions, via the permission management and external table of the first database.

Figure 5:
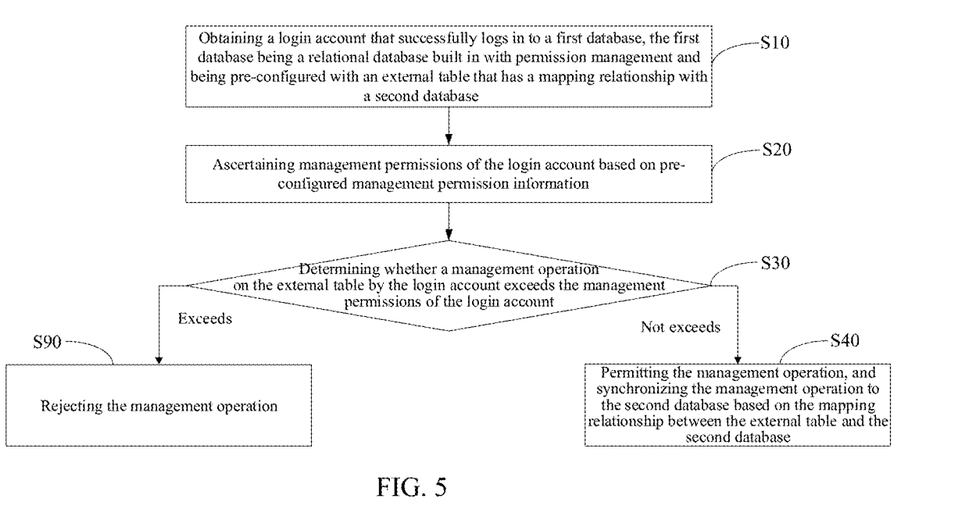
FIG. 5 is a flowchart illustrating a fourth embodiment of a method for managing database permissions according to the present application.

As illustrated in FIG. 5, a fourth embodiment of the database permission management method according to the present application further provides a database permission management method, which further includes the following block S90 on the basis of the above-described first embodiment, second embodiment, or third embodiment of the database permission management method (in this embodiment, the first embodiment of the database permission management method is taken as an example).

In S90, the method includes: if the management operation by the login account exceeds its management operations, then rejecting the management operation.

If it is found that the management operation by the login account exceeds its scope of management permission, then this management operation would be rejected, thereby realizing control of a beyond-permission operation. Further, an error message can also be made for reminding purposes.

For example, there is now an account dbatest that has successfully logged in to the first database, and the permission management system searches in the pre-configured management permission information to find that the dbatest has only the management permission of "select", then when the dbatest intends to perform an operation such as update, delete, insert or the like, it will be rejected by the permission management system, and receives an error message of "permission denied".

In this way, the background permission management of the second database is realized.

In this embodiment, if the management operation by the login account exceeds its management permissions, then this management operation would be rejected, thereby realizing control of a beyond-permission operation.

Figure 6:
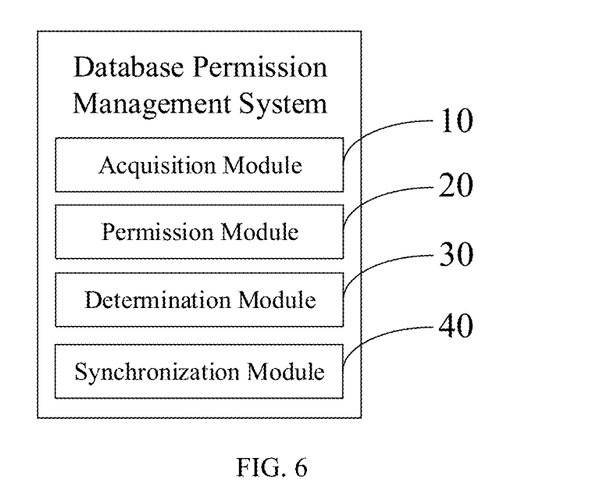
FIG. 6 is a block diagram illustrating a first and a fourth embodiment of a system for managing database permissions according to the present application.

As illustrated in FIG. 6, a first embodiment of a system for managing database permissions (hereinafter also interchangeably referred to as a database permission management system) according to the present application provides a database permission management system. The database permission management system includes an acquisition module 10, a permission module 20, a determination module 30, and a synchronization module 40.

The acquisition module 10 is configured to obtain a login account that successfully logs in to a first database, where the first database is a relational database built in with permission management and is pre-configured with an external table that has a mapping relationship with a second database.

This application utilizes the permission management function of the first database to determine the management permissions of the login account, thereby monitoring the management operations on the second database that are performed by this login account through the external table in the first database, which thus realizes the background permission management of non-relational databases such as Redis.

Specifically, as one implementation, the user may use a pre-configured account to log in to the first database, by entering a login credential such as an account name and a password thus issuing a login request. The first database is a relational database built in with permission management functionality, such as a PostgreSQL database.

The first database is pre-configured with an external table that has a mapping relationship with the second database. That is, the data stored in the second database would be synchronized to the external table, and an operation on the external table or on the data in the external table would also be synchronized to the second database, so that the second database is inserted into the first database in the form of an external table. It should be noted that the second database is a non-relational database such as Redis, and does not have permission management functionality.

When it receives the login request, the acquisition module 10 obtains the login credential such as the account name and password carried by the login request for verification.

If the login request passes the verification, then the acquisition module 10 would obtain the account that is currently successfully logged into the first database.

The permission module 20 is configured to ascertain management permissions of the login account based on pre-configured management permission information.

After the login account that successfully logs in to the first database is obtained, the permission module 20 ascertains the management permissions of the current login account based on the pre-configured management permission information.

It should be noted that the first database manages the database access permissions through roles, where each role may be a database user or a group of database users, and each role corresponds to an account. The management permissions of each role can be flexibly configured according to actual needs, including read, write, delete, search, and other permissions.

For example, assume there is a login account named dbatest. After detecting the login of the account, the permission module 20 searches in the pre-configured management permission information for the corresponding management permissions of dbatest. Thus, the management permissions of dbatest can be ascertained.

The determination module 30 is configured to determine whether a management operation on the external table by the login account exceeds the management permissions of the login account.

After ascertaining the management permissions of the login account, the determination module 30 would supervise this login account to make sure that the login account performs management operations on the second database via the external table in the first database only within its scope of management permissions.

Therefore, after the account is logged into the first database, the external table can be utilized to implement access to the data in the second database, and to further perform management operations on the second database within the scope of management permissions of this account.

Specifically, the login account can access the external table by using the SQL syntax. Thanks to the mapping relationship between the external table and the second database, the login account is actually accessing the second database via the external table.

Because the data the user sees is mapped to the external table from the second database. the user is actually currently accessing the second database.

When the user enters a management operation request, the determination module 30 would ascertain whether this management operation exceeds the scope of management permissions of this login account.

The synchronization module 40 is configured to permit the management operation by the login account if the management operation does not exceed its management permissions, and synchronize the management operation to the second database based on the mapping relationship between the external table and the second database.

If it is found that this management operation falls within the scope of management permissions of the current login account, then the synchronization module 40 would permit this management operation.

Specifically, the synchronization module 40 can perform data processing on the external table according to the management operation, such as inserting data, deleting data, deleting a table, and the like.

Meanwhile, the synchronization module 40 needs to synchronously update the changes of the external table to the second database based on the mapping relationship between the external table and the second database, in order to perform an identical management operation on the second database.

For example, there is now an account dbatest that has successfully logged into the first database, and the permission module 20 searches in the pre-configured management permission information to find that the dbatest has only the management permission of "select", then the dbatest would only be allowed to perform "select" operations when accessing the data of the second database via the external table.

According to this embodiment, the acquisition module 10 first obtains a login account that successfully logs in to a first database, where the first database is a relational database built in with permission management and is pre-configured with an external table that has a mapping relationship with a second database. Then based on pre-configured management permission information, the permission module 20 ascertains the management permissions of the current login account for purposes of permission management and control of the current login account. Then based on the management permissions of the current login account, the determination module 30 determines whether a management operation performed by the current login account on the external table exceeds the management permissions of the current login account. If the management permission by the current login account does not exceed its management permissions, then the synchronization module 40 permits this management operation, and further synchronize this management operation to the second database based on the mapping relationship between the external table and the second database. Because the management operation on the second database is performed with permission management and control, this realizes the background permission management of the second database. By connecting the first database and the second database through the external table that is previously created in the first database and that has a mapping relationship with the second database, this embodiment enables accessing the second database via the first database. When the login account performs a management operation on the external table in the first database, it is actually performing a management operation on the second database thanks to the mapping relationship between the external table and the second database. Therefore, the permission management function of the first database can be taken advantage of to restrict the management operations performed by the login account on the external table based on the login account's management permissions in the first database, thereby correspondingly restricting the management operations on the second database and so realizing the permission management of the second database. As such, a non-relational database such as Redis can be managed and controlled by the data operation permissions as the second database, which avoids the security risks posed by the fact that the database cannot implement permission management and control, and further improves the background management security of non-relational databases such as Redis.

Figure 7:
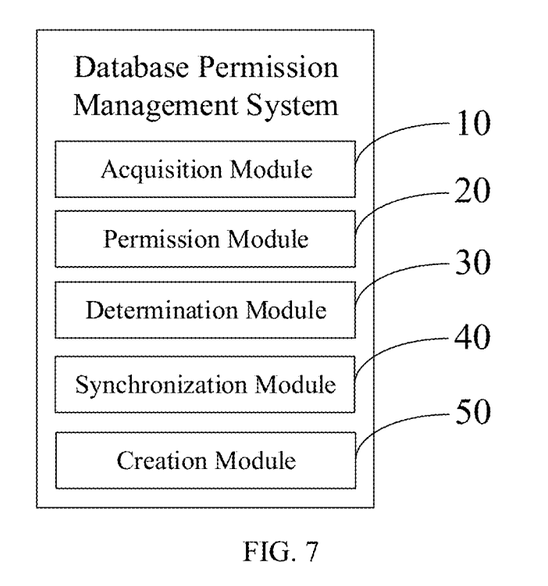
FIG. 7 is a block diagram illustrating a second and a third embodiment of a system for managing database permissions according to the present application.

As illustrated in FIG. 7, a second embodiment of the database permission management system according to the present application further provides a database permission management system, which further includes the following creation module 50 on the basis of the above-described first embodiment of the database permission management system according to this application.

The creation module 50 is configured to: create a first database instance and further create a second database in the first database instance; create an external service for the second database and authorize the first database to use the external service; create an external table in the first database, and map data in the second database to the external table based on the external service, to establish a mapping relationship between the external table and the second database.

In order to achieve the purpose of remotely accessing the second database based on the first database, the creation module 50 first needs to build up a first database instance. For example, to create a PostgreSQL instance.

In this embodiment, the PostgreSQL database instance is taken as an example of the first database instance for illustration purposes.

Then, the creation module 50 creates the second database in the PostgreSQL database instance. This embodiment uses a Redis database as an example of the second database for illustration purposes.

After the second database is created, the creation module 50 needs to establish a link between the first database and the second database.

First, the creation module 50 creates an extension by using the "create extension" statement of the SQL syntax, and then installs a Redis_fdw (foreign-data wrapper) module.

Then, the creation module 50 uses the "create server" statement of the SQL syntax to create an external service of Redis, and further sets the Address and Port of the external service. It should be noted that the Address and the Port of the external service should be set the same as the Address and the Port of the Redis database, so that a link can be established with the Redis database.

After the creation of the external service is completed, the creation module 50 authorizes the external service to be used by the PostgreSQL database, so that the PostgreSQL database can establish a link with the Redis database.

After establishing the link with the Redis database, the creation module 50 creates an external table in the PostgreSQL database, and maps the data of the Redis database to the external table, to establish a mapping relationship between the external table and the Redis database. As such, the Redis database is inserted into the PostgreSQL database in the form of an external table.

Thereafter, the user can perform management operations such as query, add, delete and the like synchronously on the data in the Redis database by performing management operations such as query, add, delete and the like on the external table.

Further, as one implementation, the creation module 50 is further configured to: create respectively corresponding external tables in the first database based on one or more data types included in the second database; map each type of data in the second database to the corresponding external table based on the external service, so as to establish the mapping relationship between the external table and the second database.

When creating the external table, the creation module 50 may create corresponding external tables based on the data types such as characters, a set, a list, etc. contained in the Redis database.

Then, based on the external service of the Redis database, the creation module 50 maps the data in the Redis database to the corresponding external tables respectively according to the data types, to establish the mapping relationship between the external table and the Redis database. Therefore, the various types of data in the Redis database can be accessed via the external table for management operations.

This realizes cross-database operations on the data.

Further, a plurality of first databases may be created in a first database instance, and each first database corresponds to a different second database, thereby realizing permission management of a plurality of second databases.

In this embodiment, the creation module 50 creates a first database instance and further creates a second database in the first database instance. Then the creation module 50 creates an external service for the second database, and authorizes the first database to use the external service, thereby establishing a link between the first database and the second database. Then the creation module 50 creates an external table in the first database, and maps the data of the second database to the external table based on the external service of the second database to establish a mapping relationship between the external table and the second database. As such, the second database is inserted into the first database in the form of an external table, so that the second database can be accessed via the external table in the first database. In this embodiment, by creating an external table in the first database, cross-database operations between the first database and the second database are realized. Thus, permission management and control of the second database can be achieved based on the permission management of the first database.

As illustrated in FIG. 7, a third embodiment of the database permission management system according to the present application further provides a database permission management system on the basis of the second embodiment of the database permission management system according to the present application. In this embodiment, the creation module 50 is further configured to: in response to reception of an entered account creation instruction, create a corresponding account in the first database and configuring its management permissions according to the account creation instruction.

After the creation module 50 creates the external table, the user can configure a user account as well as its corresponding management permissions according to needs.

After receiving the user-entered account creation instruction, the creation module 50 creates a corresponding account in the first database according to an account name carried by the account creation instruction. Further, based on the permission information carried by the account creation instruction, the creation module 50 correspondingly configures the management permissions of this account.

The management permissions of the account include search, insert, create, delete, modify, update, and so on.

Thereafter, the user can log in to the first database using the created account, and perform management operations on the data of the second database via the external table in the first database based on the management permissions of the account.

In this embodiment, if an entered account creation instruction is received, then the creation module 50 creates a corresponding account in the first database and further configures the management permissions of the account, according to the account creation instruction. As such, the user can create user accounts and management permissions of different roles according to needs, so that the roles having different needs can perform management operations on the data in the second database within their scopes of management permissions, via the permission management and external table of the first database.

As illustrated in FIG. 6, a fourth embodiment of the database permission management system according to the present application further provides a database permission management system, on the basis of the above-described first embodiment, second embodiment, or third embodiment of the database permission management system (in this embodiment, the first embodiment of the database permission management system is taken as an example). In this embodiment, the determination module 30 is further configured to: if the management operation by the login account exceeds its management operations, then reject the management operation.

If it is found that the management operation by the login account exceeds its scope of management permission, then the determination module 30 would reject this management operation, thereby realizing control of a beyond-permission operation. Further, an error message can also be made for reminding purposes.

For example, there is now an account dbatest that has successfully logged in to the first database, and the permission module 20 searches in the pre-configured management permission information to find that the dbatest has only the management permission of "select", then when the dbatest intends to perform an operation such as update, delete, insert or the like, it will be rejected by the determination module 30, and receives an error message of "permission denied".

In this way, the background permission management of the second database is realized.

In this embodiment, if the management operation by the login account exceeds its management permissions, then the determination module 30 would reject this management operation, thereby realizing control of a beyond-permission operation.

Figure 8:
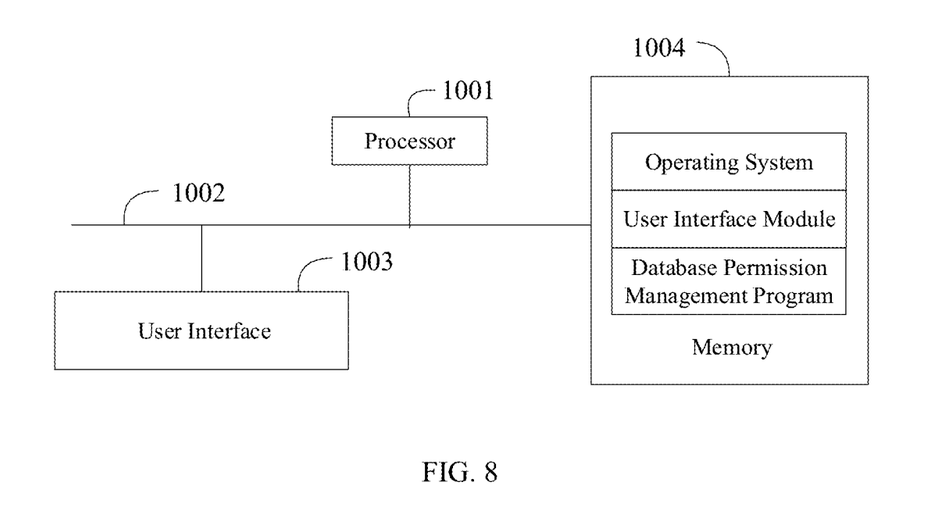
FIG. 8 is a schematic diagram illustrating a terminal in terms of hardware operating environment involved in the solutions embodied by the embodiments according to the present application.

Referring now to FIG. 8, there is depicted schematic diagram illustrating a terminal in terms of hardware operating environment involved in the solutions embodied by the embodiments according to the present application.

In the embodiments of the present application, a device for managing database permissions (hereinafter also interchangeably referred to as a database permission management device) may be a personal computer (PC), a server, or a terminal device such as a smart phone, a tablet computer, or a portable computer.

As illustrated in FIG. 8, the database permission management device includes a processor 1001 such as a CPU, a communication bus 1002, a user interface 1003, and a memory 1004. The communication bus 1002 is configured to facilitate connection and communication between these components. The user interface 1003 may include a display screen, and an input unit such as a keyboard. The memory 1004 may be a high-speed RAM memory, or a non-volatile memory such as a magnetic disk memory. The memory 1004 may also optionally be a storage device independent of the aforementioned processor 1001.

Optionally, the database permission management device may further include a camera, an RF (Radio Frequency) circuitry, a sensor, an audio circuitry, a WiFi module, and the like.

Those skilled in the art will appreciate that the terminal structure illustrated in FIG. 8 will not constitute a limitation on the database permission management device. Therefore, the database permission management device may include more or less components than those illustrated, or some components may be combined, or different arrangements of components may be employed.

As illustrated in FIG. 8, the memory 1004 as a computer storage medium may include an operating system, a network communication module, a user interface module, and a database permission management program.

In the terminal illustrated in FIG. 8, the user interface 1003 is primarily used for connecting to a client (user end) for data communication with the client, and for receiving a user entered instruction. The processor 1001 can be configured to call the database permission management program stored in the memory 1004 to perform the following operations: obtaining a login account that successfully logs in to a first database, where the first database is a relational database built in with permission management and is pre-configured with an external table that has a mapping relationship with a second database; ascertaining management permissions of the login account based on pre-configured management permission information; determining whether a management operation on the external table by the login account exceeds the management permissions of the login account; and if the management operation by the login account does not exceed its management permissions, permitting the management operation, and synchronizing the management operation to the second database based on the mapping relationship between the external table and the second database.

Further, the processor 1001 may call the database permission management program stored in the memory 1005 to further perform the following operations: creating a first database instance, and further creating a second database in the first database instance; creating an external service for the second database, and authorizing the first database to use the external service; and creating an external table in the first database, and mapping data in the second database to the external table via the external service, to establish a mapping relationship between the external table and the second database.

Further, the processor 1001 may call the database permission management program stored in the memory 1005 to further perform the following operations: creating respectively corresponding external tables in the first database based on one or more data types included in the second database; and mapping each type of data in the second database to the corresponding external table based on the external service, so as to establish the mapping relationship between the external table and the second database.

Further, the processor 1001 may call the database permission management program stored in the memory 1005 to further perform the following operations: in response to reception of an entered account creation instruction, create a corresponding account in the first database and configuring its management permissions according to the account creation instruction.

Further, the first database instance is a PostgreSQL database, while the second database is a Redis database.

Further, the processor 1001 may call the database permission management program stored in the memory 1005 to further perform the following operations: if the management operation by the login account exceeds its management operations, then reject the management operation.

The specific embodiments of the database permission management device according to this application are substantially the same as the above-described various embodiments of the database permission management method, and so they are not to be detailed herein again.

In addition, embodiments according to the present application further provide a computer-readable storage medium having stored therein a database permission management program, the database permission management program when executed by a processor performing the following operations: obtaining a login account that successfully logs in to a first database, where the first database is a relational database built in with permission management and is pre-configured with an external table that has a mapping relationship with a second database; ascertaining management permissions of the login account based on pre-configured management permission information; determining whether a management operation on the external table by the login account exceeds the management permissions of the login account; and if the management operation by the login account does not exceed its management permissions, permitting the management operation, and synchronizing the management operation to the second database based on the mapping relationship between the external table and the second database.

Further, the database permission management program when executed by the processor further performs the following operations: creating a first database instance, and further creating a second database in the first database instance; creating an external service for the second database, and authorizing the first database to use the external service; and creating an external table in the first database, and mapping data in the second database to the external table via the external service, to establish a mapping relationship between the external table and the second database.

Further, the database permission management program when executed by the processor further performs the following operations: creating respectively corresponding external tables in the first database based on one or more data types included in the second database; and mapping each type of data in the second database to the corresponding external table based on the external service, so as to establish the mapping relationship between the external table and the second database.

Further, the database permission management program when executed by the processor further performs the following operations: in response to reception of an entered account creation instruction, create a corresponding account in the first database and configuring its management permissions according to the account creation instruction.

Further, the first database instance is a PostgreSQL database, while the second database is a Redis database.

Further, the database permission management program when executed by the processor further performs the following operations: if the management operation by the login account exceeds its management operations, then reject the management operation.

The specific embodiments of the computer-readable storage medium according to this application are substantially the same as the above-described various embodiments of the database permission management method, and so they are not to be detailed herein again.

As used herein, the terms "including," "comprising," or any other variants thereof are intended to encompass a non-exclusive inclusion, so that processes, methods, articles, or devices that include a series of elements will include not only those elements, but also other elements as well that haven't been explicitly listed or those elements inherent in such processes, methods, articles, or devices. In the absence of further restrictions, the element defined by the phrase "including/comprising a . . . " will not preclude the existence of additional such elements in the processes, methods, articles, or devices that include the element.

The above numbering of embodiments according to the present application is intended for illustrative purposes only, and is not indicative of the pros and cons of these embodiments.

By the above description of embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of this application, or the portion that contributes to the prior art may be embodied as software products. Computer software products can be stored in a storage medium (e.g., a ROM/RAM, a magnetic disk, an optical disk) as described supra and may include multiple instructions that when executed can cause a computing device (e.g., a mobile phone, a computer, a server, an air conditioner, a network device, etc.), to perform the methods as described in the various embodiments of this application.

The foregoing description merely illustrates some exemplary embodiments of the application and therefore is not intended as limiting the patentable scope of the application. Any equivalent structural or flow transformations that are made taking advantage of the application and that are used directly or indirectly in other related technical fields shall all fall in the scope of patent protection of the application.

What is claimed is:

1. A method for managing database permissions, comprising:
    obtaining a login account that successfully logs in to a first database, the first database being a relational database built in with permission management wherein the first database is pre-configured with an external table that has a mapping relationship with a second database; data stored in the second database is synchronized to the external table, and an operation on the external table or on data in the external table is synchronized to the second database, and the second database is inserted into the first database in the form of the external table; and the second database is a non-relational database and does not have permission management functionality;
    ascertaining management permissions of the login account based on pre-configured management permission information;
    determining whether a management operation on the external table by the login account exceeds the management permissions of the login account; and
    in response to the management operation by the login account does not exceed its management permissions, permitting the management operation, and synchronizing the management operation to the second database based on the mapping relationship between the external table and the second database.

2. The method of claim 1, wherein the first database is pre-configured with an external table that has a mapping relationship with a second database, comprising:
    creating a first database instance, and creating the second database in the first database instance;
    creating an external service for the second database, and authorizing the first database to use the external service; and
    creating the external table in the first database, and mapping data in the second database to the external table via the external service, to establish the mapping relationship between the external table and the second database.

3. The method of claim 2, wherein the creating the external table in the first database, and mapping the data in the second database to the external table via the external service, to establish the mapping relationship between the external table and the second database comprises:
    creating respectively corresponding external tables in the first database based on one or more data types comprised in the second database; and
    mapping each type of data in the second database to the corresponding external table based on the external service, to establish the mapping relationship between the external table and the second database.

4. The method of claim 2, further comprising:
    in response to reception of an entered account creation instruction, creating a corresponding account in the first database and configuring its management permissions of the corresponding account according to the account creation instruction.

5. The method of claim 2, wherein the first database instance is a PostgreSQL database instance, and the second database is a Redis database.

6. The method of claim 1, further comprising the following operation subsequent to the determining whether the management operation on the external table by the login account exceeds the management permissions of the login account:
    in response to the management operation by the login account exceeds its management operations, rejecting the management operation.

7. A device for managing database permissions, the device comprising a memory, a processor, and a database permission management program that is stored in the memory and that is operable on the processor, the processor being configured to execute the database permission management program to perform the following operations;
    obtaining a login account that successfully logs in to a first database, the first database being a relational database built in with permission management wherein the first database is pre-configured with an external table that has a mapping relationship with a second database; data stored in the second database is synchronized to the external table, and an operation on the external table or on data in the external table is synchronized to the second database, the second database is inserted into the first database in the form of the external table; and the second database is a non-relational database and does not have permission management functionality;
    ascertaining management permissions of the login account based on pre-configured management permission information;
    determining whether a management operation on the external table by the login account exceeds the management permissions of the login account; and
    in response to the management operation by the login account does not exceed its management permissions, permitting the management operation, and synchronizing the management operation to the second database based on the mapping relationship between the external table and the second database.

8. The device of claim 7, wherein the processor is configured to execute the database permission management program to further perform the following operations:
    creating a first database instance, and creating the second database in the first database instance;

creating an external service for the second database, and authorizing the first database to use the external service; and creating the external table in the first database, and mapping the data in the second database to the external table via the external service, to establish the mapping relationship between the external table and the second database.

9. The device of claim 8, wherein the processor is configured to execute the database permission management program to further perform the following operations:

creating respectively corresponding external tables in the first database based on one or more data types included in the second database; and mapping each type of data in the second database to a corresponding external table based on the external service, to establish the mapping relationship between the external table and the second database.

10. The device of claim 8, wherein the first database instance is a PostgreSQL database instance, and the second database is a Redis database.

11. A non-transitory computer-readable storage medium having stored therein a database permission management program, the database permission management program when executed by a processor performing the following operations:

obtaining a login account that successfully logs in to a first database, the first database being a relational database built in with permission management wherein the first database is pre-configured with an external table that has a mapping relationship with a second database; data stored in the second database is synchronized to the external table, and an operation on the external table or on data in the external table is synchronized to the second database, and the second database is inserted into the first database in the form of the external table; and the second database is a non-relational database and does not have permission management functionality;

ascertaining management permissions of the login account based on pre-configured management permission information;

determining whether a management operation on the external table by the login account exceeds the management permissions of the login account; and in response to the management operation by the login account does not exceed its management permissions, permitting the management operation, and synchronizing the management operation to the second database based on the mapping relationship between the external table and the second database.

12. The non-transitory computer-readable storage medium of claim 11, wherein the database permission management program when executed by the processor further performs the following operations:

creating a first database instance, and creating the second database in the first database instance;

creating an external service for the second database, and authorizing the first database to use the external service; and creating the external table in the first database, and mapping the data in the second database to the external table via the external service, to establish the mapping relationship between the external table and the second database.

13. The non-transitory computer-readable storage medium of claim 12, wherein the database permission management program when executed by the processor further performs the following operations:

creating respectively corresponding external tables in the first database based on one or more data types included in the second database; and mapping each type of data in the second database to a corresponding external table based on the external service, to establish the mapping relationship between the external table and the second database.

14. The non-transitory computer-readable storage medium of claim 12, wherein the first database instance is a PostgreSQL database instance, and the second database is a Redis database.

* * * * *